(12) United States Patent
Cherne et al.

(10) Patent No.: US 6,985,507 B2
(45) Date of Patent: Jan. 10, 2006

(54) CARBON DIOXIDE LASER RESONATOR GAS

(75) Inventors: Larry W. Cherne, Menomonee Falls, WI (US); David A. Cherne, Oconomowoc, WI (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/454,384

(22) Filed: Jun. 3, 2003

(65) Prior Publication Data

US 2004/0004986 A1 Jan. 8, 2004

Related U.S. Application Data

(60) Provisional application No. 60/385,222, filed on Jun. 3, 2002.

(51) Int. Cl.
*H01S 3/20* (2006.01)
*H01S 3/22* (2006.01)

(52) U.S. Cl. .................................................. 372/55
(58) Field of Classification Search .......... 372/55.57, 372/59, 61, 55
See application file for complete search history.

(56) References Cited

U.S. PATENT DOCUMENTS

| | | | | |
|---|---|---|---|---|
| 4,752,454 A | * | 6/1988 | Pastor et al. ................. | 423/19 |
| 4,815,094 A | * | 3/1989 | Cantoni ...................... | 372/93 |
| 4,888,786 A | | 12/1989 | Davis et al. | |
| 4,964,137 A | | 10/1990 | Aramaki et al. | |
| 5,001,721 A | | 3/1991 | Ludewig et al. | |
| 5,073,896 A | | 12/1991 | Reid et al. | |
| 5,090,020 A | | 2/1992 | Bedwell | |
| 5,111,473 A | | 5/1992 | Rebhan et al. | |
| 5,199,267 A | | 4/1993 | Mitsui | |
| 5,246,868 A | * | 9/1993 | Busch et al. ................. | 436/101 |
| 5,251,062 A | * | 10/1993 | Snitzer et al. ............. | 359/341.1 |
| 5,430,752 A | | 7/1995 | Basting et al. | |
| 5,733,609 A | * | 3/1998 | Wang ........................ | 427/561 |
| 5,892,782 A | * | 4/1999 | Vitruk et al. ................ | 372/19 |
| 5,897,847 A | | 4/1999 | Jursich et al. | |
| 5,982,800 A | * | 11/1999 | Ishihara et al. .............. | 372/57 |
| 6,074,459 A | * | 6/2000 | Gingrich et al. ............ | 95/118 |
| 6,198,758 B1 | * | 3/2001 | Broderick et al. ............ | 372/36 |
| 6,198,762 B1 | * | 3/2001 | Krasnov ..................... | 372/87 |
| 6,549,555 B2 | | 4/2003 | Serwazi et al. | |
| 6,594,431 B2 | * | 7/2003 | Suzuki et al. ............... | 385/129 |

\* cited by examiner

*Primary Examiner*—Wilson Lee
*Assistant Examiner*—Hung Tran Vy
(74) *Attorney, Agent, or Firm*—Gerald L. Coon

(57) ABSTRACT

The present invention is directed, in part, to a carbon dioxide laser resonator gas comprising carbon dioxide, helium, and nitrogen and having a total halocarbon concentration less than about 100 parts per trillion. In one embodiment, the total halocarbon concentration is less than about 50 parts per trillion. The laser resonator gases, laser systems, and methods of the present invention provide high efficiency and high power laser light while reducing the cost of maintenance and improving the performance of a laser system by limiting the total concentration of halocarbon.

10 Claims, 1 Drawing Sheet

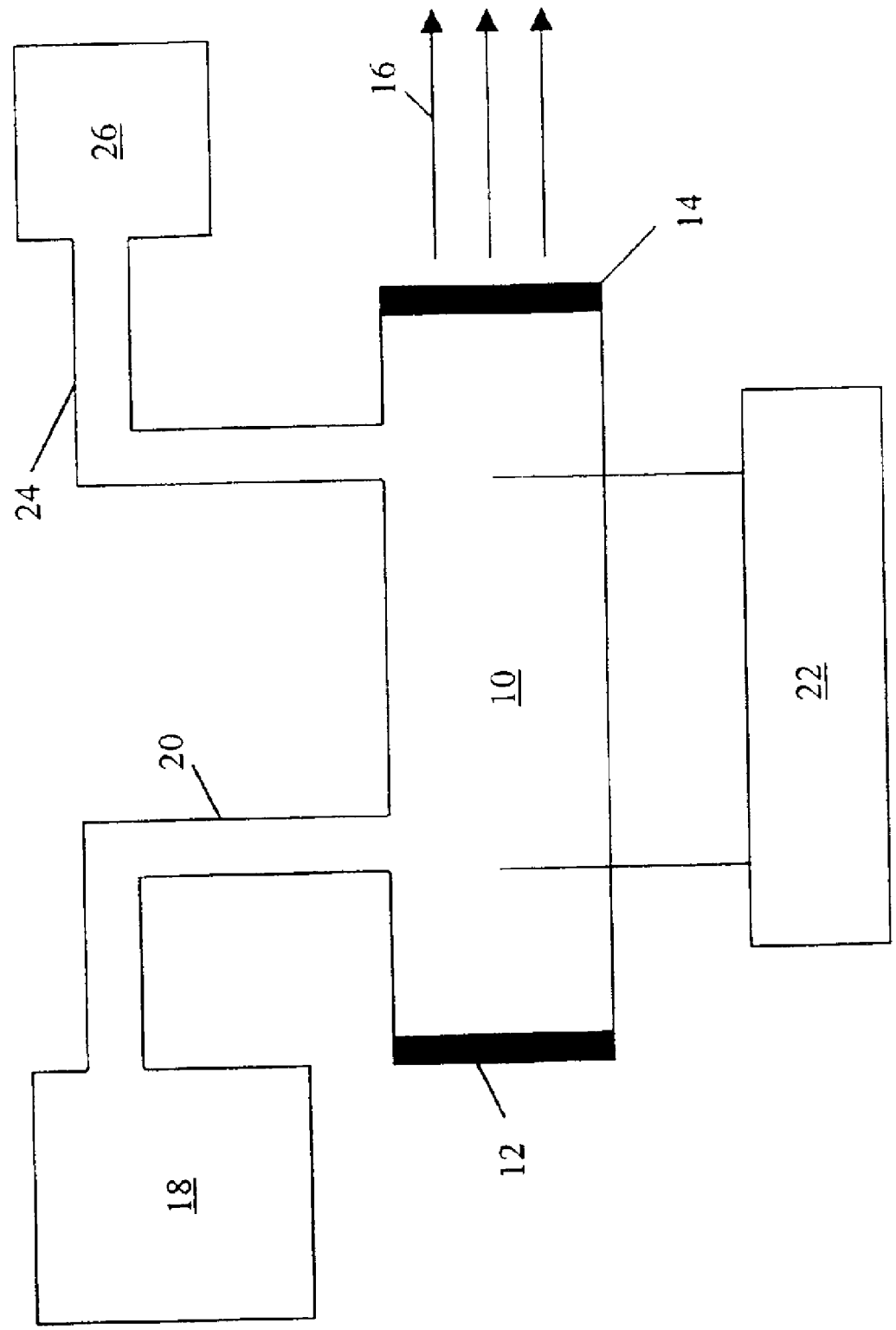

CARBON DIOXIDE LASER RESONATOR GAS

RELATED APPLICATION

This application claims the benefit of U.S. Provisional Application No. 60/385,222, filed on Jun. 3, 2002, the entire teachings of which are incorporated herein by reference.

BACKGROUND OF THE INVENTION

The carbon dioxide ($CO_2$) laser is widely used, in part, for its ability to offer high efficiency and high power. There are several carbon dioxide laser designs including, but not limited to, sealed tube lasers, waveguide lasers, axial flow lasers, transverse flow lasers, and transversely excited atmospheric lasers. Typically, carbon dioxide lasers operate at light wavelengths of about 9 to 11 micrometers.

Lasers typically produce light through the excitation of a gas medium. The carbon dioxide laser uses a mixture of carbon dioxide, nitrogen and, generally, helium as a gas medium. Carbon dioxide is excited to higher energy states using energy added to the gas mixture. Excited carbon dioxide returning to lower energy states produces laser light. Nitrogen helps to excite the carbon dioxide and increase the efficiency of the light generation processes. Helium, when present, acts as a buffer gas to aid heat transfer from the gas medium and also helps carbon dioxide to drop from lower energy levels to the ground energy state.

$CO_2$ laser resonator gases are provided in a variety of forms to comply with particular laser designs and/or laser manufacturers' specifications. For example, some $CO_2$ laser resonator gases are delivered in separate gas cylinders and are mixed prior to their entry to the laser resonator or are mixed within the laser resonator. Other laser resonator gases are delivered premixed and are directly supplied to the laser resonator. Laser resonator gas, in some instances, is provided within a sealed laser assembly.

Typically, gases compressed, stored, or conducted within the laser system include a significant concentration of halocarbons. The amount of halocarbon varies, for example, depending on the design and/or condition of the laser light generation equipment, e.g., gas compressors, fittings, storage vessels, lubricants, seals and O-rings.

SUMMARY OF THE INVENTION

The present invention is directed, in part, to a carbon dioxide laser resonator gas comprising carbon dioxide, helium, and nitrogen and having a total halocarbon concentration less than about 100 parts per trillion. In other embodiments, the total halocarbon concentration is less than about 50 parts per trillion.

The invention also includes a method for producing a carbon dioxide laser resonator gas and the laser resonator gas produced by that method. In one embodiment, the method comprises (a) removing halocarbons from one or more gases selected from the group consisting of carbon dioxide, helium, and nitrogen; and (b) combining carbon dioxide, helium and nitrogen gases, at least one of which is produced in accordance with step (a), whereby a carbon dioxide laser resonator gas is formed that has a total halocarbon concentration of less than about 100 parts per trillion.

Also included in the present invention is a carbon dioxide laser system that comprises (a) a laser resonator; and (b) means for supplying carbon dioxide, helium, and nitrogen gases to the laser resonator as a carbon dioxide laser resonator gas said laser resonator gas having a total halocarbon concentration less than about 100 parts per trillion. In one embodiment, the means for supplying carbon dioxide, helium, and nitrogen gases to the laser resonator includes mixing the gases and then conveying the mixed laser resonator gas to the laser resonator. In another embodiment, the means for supplying carbon dioxide, helium, and nitrogen gases to the laser resonator includes means for compressing one or more of the laser resonator gas components or a mixture of two or more laser resonator gas components.

A method for producing laser light is also provided. The method comprises operating a carbon dioxide laser by exciting a gas mixture comprising carbon dioxide, helium, and nitrogen and having a total halocarbon concentration less than about 100 parts per trillion via an energy input. For example, the invention includes a method for cutting an article comprising (a) exciting a gas mixture, comprising carbon dioxide, helium, and nitrogen and having a total halocarbon concentration less than about 100 parts per trillion, to produce a beam of coherent light; and (b) directing the beam of coherent light upon the article.

Carbon dioxide laser resonator gases containing halocarbons typically experience a reduction of effectiveness and/or durability of the laser system components. When the halocarbon compound is present in a laser resonator gas at a concentration exceeding about 100 parts per trillion (ppt), the halocarbon compound can cause disruptions that appear as white flashes in the normally pink to purple light that emanates from the laser resonator. In addition, carbon dioxide laser resonator gases containing a total halocarbon concentration less than about 100 ppt can produce laser light at reduced energy input levels as compared to lasers operating using carbon dioxide laser resonator gases containing a total halocarbon concentration in excess of about 100 ppt for a given laser power output. The above-mentioned disruptions in the laser light and increased input power requirements indicate a reduction in the power efficiency of the laser. Without being held to any particular theory, it is thought that the disruptions are caused by disassociation of long halocarbon compound chemical chains in the high energy field produced in the laser resonator. The disassociated chemical chains recombine into unwanted and aggressive contaminant compounds such as, for example, hydrogen chloride (HCl), hydrogen fluoride (HF) and other disruptive chemical chains. The contaminant compounds decrease the effectiveness of the optical components in the laser equipment that reflect and allow the laser light to pass through. As a result, the durability of these optical components is greatly reduced.

Further, because of the contaminant build-up on the laser optical components, it is often necessary to stop the operation of the laser, for example, about every 600 to 1200 hours, to clean or replace the optics in the resonator. In general, laser manufacturers suggest cleaning or replacing the optics after about 2,000 hours of use. Other factors determining the frequency of cleaning or replacing the optics include the purity of the gas, integrity of the gas delivery system, power at which the resonator is operated, quality of the optics, and the duty cycle of the laser.

Because the laser is a major investment for the operator of the laser, whenever the laser operation is shut down, the operator incurs a significant cost from lost operating time. In addition, although the cost may be reduced by cleaning the optics rather than replacing the optics every time the resonator is serviced, the cost of maintaining or cleaning the laser is still significant as this expense may be repeated several times per year.

The invention provides a cleaner and more advantageous laser resonator gas mixture having a low concentration of halocarbons, e.g., less than 100 ppt halocarbons, to ensure cleanliness in the system, to prevent laser shutdown, and to reduce input power requirements.

BRIEF DESCRIPTION OF THE DRAWING

The FIGURE is a schematic diagram illustrating one embodiment of the present invention, a carbon dioxide laser system.

DETAILED DESCRIPTION OF THE INVENTION

The present invention is directed, in part, to a carbon dioxide laser resonator gas comprising carbon dioxide, helium, and nitrogen and having a total halocarbon concentration less than about 100 parts per trillion. In one embodiment, the total halocarbon concentration is less than about 50 parts per trillion. The laser resonator gases, laser systems, and methods of the present invention provide high efficiency and high power laser light while reducing the cost of maintenance and improving the performance of a laser system by limiting the total concentration of halocarbon.

Halocarbon compounds are compounds comprising carbon and at least one halogen such as bromine, chlorine, fluorine or iodine. Two subclasses of halocarbon are chlorocarbons and fluorocarbons. Chlorocarbons comprise carbon and chlorine, whereas fluorocarbons comprise carbon and fluorine. Typically, halocarbon compounds such as, for example, chlorotrifluoroethylene (CTFE) and perfluoropolyether (PFPE) are used in lubricants, e.g., gas compressor lubricants; seals; and O-rings for laser light generation equipment. Occasionally, fluorocarbons and chlorocarbons are blended together to obtain desired operating characteristics.

In one embodiment, the invention provides a laser resonator gas mixture that includes a moisture content of less than 0.5 parts per million (ppm), a total hydrocarbon content of less than 0.1 ppm, and a halocarbon content of less than about 100 parts per trillion (ppt). The laser resonator gas may further include oxygen in an amount of less than about 2 ppm.

Carbon dioxide laser resonator gases of the present invention generally comprise carbon dioxide at a concentration of about 1 to about 20% by volume, for example, about 1 to about 15% or about 1 to about 10% by volume; nitrogen at a concentration of about 10 to about 85% by volume, for example, about 15 to about 80% or about 20 to about 75% by volume; and the balance, helium, for example, at a concentration of about 5 to about 89% or about 15 to about 79% by volume. In one embodiment, the laser resonator gas of the present invention is formed by mixing component gases. For example, commercially available helium (e.g., Praxair Part Nos. HE 5.5TG trace analytical grade or HE 5.5LS laser grade), nitrogen (e.g., Praxair Part Nos. NI 5.5TG trace analytical grade or NI 5.5LS laser grade) and carbon dioxide (e.g., Praxair Part No. CD 4.8SE or CD 5.5LS laser grade) (All component gases obtained from Praxair, Inc., Danbury Conn.) are combined to form the laser resonator gas. Alternatively, one or more component gases are produced such that upon mixing the total halocarbon concentration is less than about 100 parts per trillion.

The invention provides a unique laser resonator gas mixture that significantly reduces the formation of unwanted contaminants on the laser optical components. As a result, the laser resonator gas mixture of the invention reduces the frequency of cleaning and replacing of the optical components, significantly reducing laser equipment maintenance costs. In one embodiment, the laser is operated for a longer period of time before performing the step of periodically cleaning the optical components as compared to an alternative method for producing laser light comprising exciting a laser resonator gas comprising carbon dioxide, helium, and nitrogen and having a total halocarbon concentration greater than about 100 parts per trillion. In one aspect, the lifespan of the optical components is greater as compared to the alternative method for producing laser light that comprises exciting a laser resonator gas comprising carbon dioxide, helium, and nitrogen and having a total halocarbon concentration greater than about 100 parts per trillion.

The laser resonator gas of the present invention contributes to overall improved performance of the laser system. Lasers employing the laser resonator gas of the invention provide improved energy efficiency over carbon dioxide lasers employing laser resonator gases comprising total halocarbon concentrations that exceed about 100 ppt.

Generally, as laser output has become more powerful, the purity requirements for laser resonator gases have become more stringent. It is typical for a $CO_2$ lasers to produce about 2.5 to 6 kW of output power, whereas the early carbon dioxide lasers, employing less pure laser resonator gases, produced about 1 to 1.5 kW of output power. The purity of a compressed gas is defined as follows:

| Purity | 9 Grade | Total Impurities |
| --- | --- | --- |
| 99.9999% | 6.0 | 1 ppm |
| 99.9995% | 5.5 | 5 ppm |
| 99.999% | 5.0 | 10 ppm |
| 99.995% | 4.5 | 50 ppm |
| 99.99% | 4.0 | 100 ppm |

The limits of detrimental and/or undesirable contaminants that may affect the performance of the laser equipment, e.g., moisture or total hydrocarbon content (THC), are typically specified in addition to a requirement for a specific number of nines of purity or "9 Grade" as shown above. For example, the $CO_2$ laser industry generally has a minimum gas purity requirement of:

| Gas | Purity | 9 Grade | Moisture | THC |
| --- | --- | --- | --- | --- |
| Helium | 99.997% | 4.7 | <5 ppm | <1 ppm |
| Nitrogen | 99.999% | 5.0 | <5 ppm | <1 ppm |
| Carbon Dioxide | 99.995% | 4.5 | <5 ppm | <1 ppm |

The standard laser resonator gas used in the industry can have from about 35 to about 50 ppm of total contaminants. Moisture and total hydrocarbon content levels above these limits often cause problems with $CO_2$ laser resonators. While halocarbon concentration is typically not measured or controlled, the halocarbon concentration of gases in the laser industry standard gas from a source plant ranges from about 1 ppm to about 500 ppb, depending on the condition of the gas plant equipment. The halocarbon level in these gases is not limited to a single halocarbon specification.

In one embodiment, the invention includes a carbon dioxide laser resonator gas having a concentration of halocarbons low enough to promote cleanliness in the laser system and to prevent more frequent laser shutdown. For example, the halocarbon concentration of the laser resonator gas is less than 10 parts per billion (ppb) or less than about 1 ppb. In other embodiments, the halocarbon concentration of the laser resonator gas is less than about 800 parts per trillion (ppt), less than about 500 ppt, less than about 300 ppt, less than about 200 ppt, less than about 100 ppt, less than about 75 ppt, or less than about 50 ppt, for example, less than about 25 ppt, or less than about 10 ppt.

In some embodiments, the moisture, hydrocarbon, and oxygen impurities contained in the $CO_2$ laser resonator gases are limited to further improve the performance of the laser and the durability of the optical components. In particular, the laser resonator gas includes a moisture content of less than about 0.5 parts per million (ppm), e.g., less than about 0.3, 0.2 or less than about 0.1 ppm, and a total hydrocarbon content of less than 0.1 ppm, e.g., less than about 0.05 or less than about 0.01 ppm. In one embodiment, the concentration of oxygen in the carbon dioxide laser resonator gas is less than about 5 ppm, e.g., less than about 4, 2, or less than about 1 ppm. For example, the laser resonator gas has a total impurity concentration less than about 10 parts per million, for example, less than about 5 ppm. In one embodiment, the total impurity concentration is comprised of compounds other than carbon dioxide, helium, and nitrogen. In another embodiment, the total impurity concentration is comprised of compounds other than carbon dioxide, helium, nitrogen, and carbon monoxide. In some embodiments, one or more of the above stated concentrations of species, e.g., total impurities, moisture, hydrocarbon, and/or oxygen, are also applied to laser resonator gas component gases $CO_2$, $N_2$ and He.

In one embodiment, the laser resonator gas of the present invention has a gas mix accuracy of about +/−5%, +/−4%, +/−3%, or preferably, about +/−2%, about +/−1%, or about +/−0.1% or less by volume. The laser resonator gas or the laser resonator gas components can be provided in one or more gas storage devices such as gas cylinders, e.g., aluminum cylinders, optionally, with pressure retaining valves. Pressure retaining valves keep the inside of the cylinders clean between uses and keeps out extraneous contaminants. Other valves, e.g., non-pressure retaining valves, can also be used.

The purity level of other possible minor gas components, including but not limited to CO, $O_2$, Xe, and $H_2$, may be lower than 99.9995%. It is important to provide these minor gas components at reasonable purity commensurate to a mixture of this quality with special attention to a controlling the halocarbon content.

The laser resonator gases described herein are suitable for use in a variety of carbon dioxide laser systems including, but not limited to, sealed tube lasers, waveguide lasers, axial flow lasers, transverse flow lasers (also known as cross-flow lasers), and transversely excited atmospheric lasers.

An example of a carbon dioxide laser system is shown in the FIGURE. The carbon dioxide laser system illustrated comprises laser resonator 10 that includes rear optics 12 and output optics 14. Rear optics 12 typically comprises a reflector, e.g., a total reflector, whereby light is reflected back into the laser resonator 10. Output optics 14 typically comprises a partially reflective surface whereby a portion of light is reflected back into laser resonator 10 and a portion is emitted from the laser resonator as coherent laser light 16. The excitation medium, e.g., laser resonator gas such as a mixture of carbon dioxide, helium, and nitrogen gases having a total halocarbon concentration less than about 100 parts per trillion, is provided by gas supply means 18. In one embodiment, gas supply means 18 comprises one or more gas storage devices, e.g., gas cylinders, as well as any necessary valves, conduit, mixers and/or compressors. In another embodiment, gas supply means 18 includes one or more gas generation devices. Gas generation devices include equipment such as, for example, gas compressors, mixers, valves, gas conduit, gas storage devices, and gas purification apparatus, e.g., activated carbon, filters, traps, and selective membranes.

The equipment of gas supply means 18 is constructed such that contact between the excitation medium, e.g., component gases and/or laser resonator gas, and any halocarbon containing material is minimized whereby the laser resonator gas, a mixture of carbon dioxide, helium, and nitrogen gases, has a total halocarbon concentration less than about 100 parts per trillion. For example, gas storage devices and/or conduit include pressure retaining valves to prevent extraneous contamination of the gas. In one embodiment, straight pipe threads are used for conduit connections to reduce the chance of outgassing of halocarbons from any polytetrafluoroethylene (PTFE) tape used on the threads. In other embodiments, polytetrafluoroethylene tape is not used or is used in a manner that prevents outgassing of halocarbons into the gas(es). In a preferred embodiment, compression fittings are used instead of threaded fittings. For example, conduit connections are made using VCR® fittings (Cajon Co., Macedonia, Ohio). In one embodiment, halocarbon containing lubricants, seals, and O-rings, for example, lubricants, seals, and O-rings containing CTFE and PFPE, are not used in applications that may result in contamination of component gas(es) with halocarbons such that the laser resonator gas, a mixture of carbon dioxide, helium, and nitrogen gases, has a total halocarbon concentration less than about 100 parts per trillion. In one embodiment, gas supply means 18 comprises a gas purification apparatus, e.g., activated carbon, filters, traps, and selective membranes, for removing halocarbons from the laser resonator gas or laser resonator gas component gases.

The excitation medium, e.g., laser resonator gas, is directed to laser resonator 10 via gas conduit means 20. Gas conduit means 20 comprises gas conduit, valves, and/or fittings to convey gases from gas supply means 18 to laser resonator 10. The equipment of gas conduit means 20 preferably is constructed such that contact between component gases and/or laser resonator gas and any halocarbon containing material is minimized whereby the laser resonator gas, a mixture of carbon dioxide, helium, and nitrogen gases, has a total halocarbon concentration less than about 100 parts per trillion. Techniques for minimizing contact between component gases and/or laser resonator gas and halocarbon containing materials are described above.

Excitation mechanism 22 is used to supply input energy to the carbon dioxide laser gas contained in laser resonator 10. Excitation mechanism 22 includes, for example, a voltage and/or radio frequency source, e.g., direct current (DC), alternating current (AC), radio frequency (RF), repetitive pulses or any combination thereof, for application of energy to the carbon dioxide laser resonator gas.

The excitation medium, e.g., laser resonator gas, is conveyed from the laser resonator via gas conduit means 24. Gas conduit means 24 comprises gas conduit, valves, and/or fittings to convey gases from laser resonator 10 to gas disposal means 26. The equipment of gas conduit means 24 preferably is constructed such that contact between component gases and/or laser resonator gas and any halocarbon containing material is minimized whereby the laser resonator gas, a mixture of carbon dioxide, helium, and nitrogen gases, has a total halocarbon concentration less than about 100 parts per trillion. However, in the case where gas disposal means 26 is a waste gas disposal apparatus, e.g., a atmospheric vent, the equipment of gas conduit means 24 does not necessarily prevent or reduce halocarbon contamination.

In one embodiment, gas disposal means 26 comprises apparatus for waste disposal. In other embodiments, gas disposal means 26 comprises gas regeneration means whereby gas is purified, e.g., by activated carbon, filters, and/or selective membranes, treated and/or recycled to laser resonator 10, gas supply means 18, or gas conduit means 20. In these embodiments, the equipment of gas disposal means 26 preferably is constructed such that contact between laser resonator gas and any halocarbon containing material is minimized whereby the laser gas entering laser resonator 10 has a total halocarbon concentration less than about 100 parts per trillion. Examples of types of laser gas flow systems suitable for the present invention include, but are not limited to, axial flow laser systems, cross flow laser systems, and sealed tube laser systems. Techniques for minimizing contact between component gases and/or laser gas and halocarbon containing materials are described above.

The present invention is also directed to a method for producing laser light and a method for application of that laser light. The methods include operating a carbon dioxide laser by exciting a gas mixture comprising carbon dioxide, helium, and nitrogen and having a total halocarbon concentration less than about 100 parts per trillion via an energy input. For example, the invention includes a method for cutting, surface modifying, or welding an article comprising (a) exciting a gas mixture, comprising carbon dioxide, helium, and nitrogen and having a total halocarbon concentration less than about 100 parts per trillion, to produce a beam of coherent light; and (b) directing the beam of coherent light upon the article. Articles suitable for cutting or surface modification using laser light generated in accordance with the invention describe herein include, but are not limited to, articles comprising wood, metal, rock, ceramic, plastic, and textile. Articles suitable for welding using laser light generated in accordance with the invention described herein include, but are not limited to, articles comprising metal, e.g., steel, stainless steel, aluminum, titanium, nickel, copper; ceramic; and plastic.

The invention is illustrated by the following examples, which are not intended to be limiting in any way.

EXEMPLIFICATION

Materials

Laser resonator gases in Examples 1–3 are produced using the following gases, each commercially available from Praxair, Inc. (Danbury, Conn.):

| | |
|---|---|
| Helium: | Praxair Part No. HE 5.5 TG trace analytical grade, having less than 50 ppt halocarbon |
| Nitrogen: | Praxair Part No. NI 5.5 TG trace analytical grade, having less than 50 ppt halocarbon |
| Carbon Dioxide: | Praxair Part No. CD 4.8 SE, having less than 100 ppb halocarbon, or Praxair Part No. CD 5.5 LS, having less than 100 ppt halocarbon |
| Carbon Monoxide: | Praxair Part No. CO 3.0 UH |

Example 1

This example describes the use of a laser resonator gas of the present invention in 4 kW and 6 kW Tanaka $CO_2$ lasers (Model Nos. LMX-225 and LMX-325, respectively) using Fanuc laser resonators (Model Nos. TF-3500A and TF-6000B, respectively).

In 4 kW and 6 kW laser resonators, the laser industry standard gas is replaced with the laser resonator gas of the invention. The replacement laser resonator gas contains about 5% carbon dioxide (Praxair Part No. CD 5.5LS), about 40% helium (Praxair Part No. HE 5.5LS laser grade), and about 55% nitrogen (Praxair Part No. NI 5.5LS laser grade) (percentages by volume). The moisture, THC, and oxygen content levels are limited and the accuracy of the laser resonator gas mixture is controlled to limit the halocarbon concentration to less than 100 ppt. The carbon dioxide component gas contains no more than 0.5 ppm water, 10 ppb THC, and 2 ppm oxygen. The helium component gas contains no more than 1 ppm water, 0.1 ppm THC, and 1 ppm oxygen. The carbon dioxide component gas contains no more than 1 ppm water, 0.1 ppm THC, and 1 ppm oxygen. The resulting laser resonator gas has less than 5 ppm of total contaminants.

After these modifications, a reduction in the frequency of required optics maintenance is expected as compared to the frequency of maintenance required when using the laser industry standard gas.

Example 2

This example describes the use of a laser resonator gas of the present invention in a 3.5 kW Mitsubishi $CO_2$ laser (Model No. 3015LVP-35CF).

Using a conventional laser resonator gas, the $CO_2$ laser is rated for an input power of 161 amperes at 480 volts. When input power reaches 161 amperes at 480 volts, the maximum operating amperage of the laser resonator, the laser is typically shut down for maintenance. The laser is operated beginning at about 150 amperes at 480 volts input power following routine maintenance.

The conventional laser resonator gas is then replaced with a laser resonator gas having about 4% carbon monoxide (Praxair Part No. CO 3.0UH), about 8% carbon dioxide (Praxair Part No. CD 5.5LS), about 28% helium (Praxair Part No. HE 5.5TG trace analytical grade), and about 60% nitrogen (Praxair Part No. NI 5.5TG trace analytical grade) (percentages by volume). Using this laser resonator gas, the initial input power requirement drops to 144 amperes at 480 volts to produce 3.5 kW. This reduction of 6 amperes of primary current represents a reduction of about 2.88 kW in electricity requirements, which assuming US$0.06/kWh electricity costs, produces about US$0.17/hour reduction in electricity costs for laser operation. Thus, by limiting the halocarbon concentration in the laser resonator gas to less than about 100 ppt, the power efficiency of the laser is improved.

Example 3

This example describes the use of a laser resonator gas of the present invention in a 2 kW Bystronic $CO_2$ laser (Model No. 3015). This laser uses component gases that are mixed in a mixing chamber contained within the laser system.

The laser resonator is initially operated with a laser resonator gas formed from about 60% helium (Praxair Part No. HE 4.7LS), about 35% nitrogen (Praxair Part No. NI 5.0LS), and about 5% carbon dioxide (Praxair Part No. CD 4.5LS) (percentages by volume). These component gases are also commercially available from Praxair, Inc. (Danbury Conn.). The laser does not come up to the rated output power when this gas mixture is used. The gas components are then replaced with helium having less than 50 ppt halocarbon (HE 5.5TG trace analytical grade), nitrogen having less than 50 ppt halocarbon (NI 5.5TG trace analytical grade), and carbon dioxide having less than 100 ppt halocarbon (Praxair Part No. CD 4.5LS) in the same proportions. The laser is then operated at the rated output power without incident. This laser resonator gas, in accordance with the present invention, contains less than about 100 ppt halocarbon.

The helium component gas, having less than 50 ppt halocarbon (HE 5.5TG trace analytical grade), is replaced with a higher purity research grade 6.0 helium gas (99.9999% pure) (Praxair Part No. HE 6.0RS, Praxair, Danbury Conn.). The research grade 6.0 helium is tested for 9 different contaminants ($O_2$, $H_2O$, $CO_2$, CO, $N_2$, Ar, Ne, $H_2$, and total hydrocarbon content (THC)) at very low levels. Although, the research grade 6.0 helium is not tested for halocarbon content, it is believed that the halocarbon concentration is significantly greater than the less than 100 ppt halocarbon concentration of the present invention's laser resonator gas. The laser does not maintain the rated output power when the resulting gas mixture is used. The use of the higher purity helium component causes a significantly greater number of disruptions, and thus reduces the power efficiency of the $CO_2$ laser as compared to the laser resonator gas of the present invention.

EQUIVALENTS

While this invention has been particularly shown and described with references to preferred embodiments thereof, it will be understood by those skilled in the art that various changes in form and details may be made therein without departing from the scope of the invention encompassed by the appended claims.

We claim:

1. A carbon dioxide laser resonator gas comprising carbon dioxide, helium, and nitrogen and having a total halocarbon concentration less than about 100 parts per trillion, a moisture concentration of less than about 0.5 parts per million, a total hydrocarbon content less than about 0.1 parts per million, and an oxygen concentration of less than about 2 parts per million.

2. The laser resonator gas of claim 1 comprising about 1 to about 10% by volume carbon dioxide and about 20 to about 75% by volume nitrogen.

3. The laser resonator gas of claim 1 wherein the total halocarbon concentration is less than about 50 parts per trillion.

4. The laser resonator gas of claim 1 further comprising a gas selected from the group consisting of carbon dioxide, hydrogen, and xenon.

5. The laser resonator gas of claim 1 having a total impurity concentration less than about 10 parts per million wherein the total impurity concentration is comprised of compounds other than carbon dioxide, helium, and nitrogen.

6. The laser resonator gas of claim 1 wherein the total halocarbon concentration comprises a halocarbon selected from the group consisting of chlorotrifluoroethylene and perfluoropolyether.

7. A carbon dioxide laser system comprising:
   (a) a laser resonator; and
   (b) means for supplying carbon dioxide, helium, and nitrogen gases to the laser resonator as a carbon dioxide laser resonator gas, said laser resonator gas having a total halocarbon concentration less than about 100 parts per trillion, a moisture concentration of less than about 0.5 parts per million, a total hydrocarbon content less than about 0.1 parts per million, and an oxygen concentration of less than about 2 parts per million.

8. The laser system of claim 7 wherein the means for supplying carbon dioxide, helium, and nitrogen gases to the laser resonator includes at least one gas conduit.

9. The laser system of claim 7 wherein the means for supplying carbon dioxide, helium, and nitrogen gases to the laser resonator includes at least one gas compressor.

10. The laser system of claim 7 wherein the laser resonator gas has a total halocarbon concentration less than about 50 parts per trillion.

* * * * *